(12) United States Patent
Jellinek

(10) Patent No.: US 7,818,435 B1
(45) Date of Patent: Oct. 19, 2010

(54) REVERSE PROXY MECHANISM FOR RETRIEVING ELECTRONIC CONTENT ASSOCIATED WITH A LOCAL NETWORK

(75) Inventor: Herbert D. Jellinek, Aptos, CA (US)

(73) Assignee: FusionOne, Inc., San Jose, CA (US)

( * ) Notice: Subject to any disclaimer, the term of this patent is extended or adjusted under 35 U.S.C. 154(b) by 1155 days.

(21) Appl. No.: 09/738,013

(22) Filed: Dec. 14, 2000

(51) Int. Cl.
| | |
|---|---|
| *G06F 15/16* | (2006.01) |
| *G06F 17/30* | (2006.01) |
| *G06F 17/21* | (2006.01) |
| *G06F 17/24* | (2006.01) |
| *G06F 15/173* | (2006.01) |
| *G06F 7/00* | (2006.01) |
| *G06F 17/00* | (2006.01) |
| *G06F 17/27* | (2006.01) |
| *G06F 17/28* | (2006.01) |

(52) U.S. Cl. .............. 709/229; 709/203; 709/218; 709/219; 715/208; 707/104.1

(58) Field of Classification Search .............. 709/203, 709/206, 217–219, 223, 224, 229; 707/10, 707/104.1; 715/208, 513
See application file for complete search history.

(56) References Cited

U.S. PATENT DOCUMENTS

| | | | |
|---|---|---|---|
| 4,887,212 A | 12/1989 | Zamora et al. ............ 364/419 |
| 5,111,398 A | 5/1992 | Nunberg et al. ........... 364/419 |
| 5,115,466 A | 5/1992 | Presttun | |
| 5,130,993 A | 7/1992 | Gutman et al. ............. 371/42 |
| 5,146,221 A | 9/1992 | Whiting et al. ............... 341/67 |
| 5,329,619 A | 7/1994 | Page et al. .................. 395/200 |
| 5,392,390 A | 2/1995 | Crozier ....................... 395/161 |
| 5,418,854 A | 5/1995 | Kaufman et al. ............ 713/156 |
| 5,418,908 A | 5/1995 | Keller et al. ................ 395/200 |
| 5,425,079 A | 6/1995 | Noda et al. | |
| 5,483,352 A | 1/1996 | Fukuyama ................. 358/402 |

(Continued)

FOREIGN PATENT DOCUMENTS

| | | |
|---|---|---|
| CN | 1202662 | 12/1998 |

(Continued)

OTHER PUBLICATIONS

Finnigan, Anne, "The Safe Way to Shop Online," Sep. 1998, p. 162, Good Housekeeping, v. 227 No. 3.

(Continued)

*Primary Examiner*—Vivek Srivastava
*Assistant Examiner*—Melvin H Pollack
(74) *Attorney, Agent, or Firm*—Haverstock & Owens, LLP

(57) ABSTRACT

A method and apparatus for processing requests for delivery of electronic content is provided. According to one aspect of the invention, a request for delivery of first electronic content is received, where (1) the request is for delivery of the first electronic content to a destination client that is not on a local network, and (2) the first electronic content includes one or more links that are only resolvable within the local network. In response to the request, the first electronic content is retrieved, and first updated content is generated by modifying the one or more links associated with the first electronic content to include information identifying a server that can be addressed outside the local network. The first updated content is then delivered to the destination client.

39 Claims, 7 Drawing Sheets

U.S. PATENT DOCUMENTS

| | | | |
|---|---|---|---|
| 5,485,161 A | 1/1996 | Vaughn | 342/357.13 |
| 5,519,433 A | 5/1996 | Lappington et al. | 725/110 |
| 5,519,606 A | 5/1996 | Frid-Nielsen et al. | 364/401 |
| 5,543,789 A | 8/1996 | Behr et al. | 340/995 |
| 5,544,061 A | 8/1996 | Morimoto et al. | 340/995 |
| 5,561,446 A | 10/1996 | Montlick | 345/173 |
| 5,574,906 A | 11/1996 | Morris | 395/601 |
| 5,579,489 A | 11/1996 | Dornier et al. | |
| 5,588,009 A | 12/1996 | Will | 371/33 |
| 5,592,470 A | 1/1997 | Rudrapatna et al. | |
| 5,623,406 A | 4/1997 | Ichibah | 364/999.999 |
| 5,623,661 A | 4/1997 | Hon | 395/601 |
| 5,628,005 A | 5/1997 | Hurvig | 395/608 |
| 5,630,081 A | 5/1997 | Rybicki et al. | 395/348 |
| 5,638,508 A | 6/1997 | Kanai et al. | 714/20 |
| 5,640,577 A | 6/1997 | Scharmer | 395/765 |
| 5,644,709 A | 7/1997 | Austin | |
| 5,647,002 A | 7/1997 | Brunson | 380/49 |
| 5,649,195 A | 7/1997 | Scott et al. | 395/617 |
| 5,650,800 A | 7/1997 | Benson | |
| 5,666,397 A | 9/1997 | Lamons et al. | |
| 5,666,553 A | 9/1997 | Crozier | 395/803 |
| 5,682,524 A | 10/1997 | Freund et al. | 395/605 |
| 5,684,990 A | 11/1997 | Boothby | 395/619 |
| 5,694,596 A | 12/1997 | Campbell | 395/610 |
| 5,699,255 A | 12/1997 | Ellis et al. | 701/212 |
| 5,701,423 A | 12/1997 | Crozier | 395/335 |
| 5,706,509 A | 1/1998 | Man-Hak Tso | 395/617 |
| 5,710,922 A | 1/1998 | Alley et al. | 395/617 |
| 5,727,202 A | 3/1998 | Kucala | 395/610 |
| 5,727,950 A | 3/1998 | Cook et al. | 434/350 |
| 5,729,735 A | 3/1998 | Meyering | 395/610 |
| 5,729,739 A | 3/1998 | Cantin et al. | 395/614 |
| 5,729,743 A | 3/1998 | Squibb | 395/619 |
| 5,742,792 A | 4/1998 | Yanai et al. | 395/489 |
| 5,745,750 A | 4/1998 | Porcaro | 707/102 |
| 5,745,906 A | 4/1998 | Squibb | 707/203 |
| 5,757,920 A | 5/1998 | Misra et al. | 380/25 |
| 5,758,150 A | 5/1998 | Bell et al. | 395/610 |
| 5,758,355 A | 5/1998 | Buchanan | 707/201 |
| 5,764,899 A | 6/1998 | Eggleston et al. | 709/203 |
| 5,768,480 A | 6/1998 | Crawford, Jr. et al. | |
| 5,768,597 A | 6/1998 | Simm | 395/712 |
| 5,771,354 A | 6/1998 | Crawford | 395/200.59 |
| 5,778,346 A | 7/1998 | Frid-Nielsen et al. | 705/9 |
| 5,778,361 A | 7/1998 | Nanjo et al. | 707/500 |
| 5,778,367 A | 7/1998 | Wesinger et al. | 395/10 |
| 5,778,388 A | 7/1998 | Kawamura et al. | 707/203 |
| 5,781,901 A * | 7/1998 | Kuzma | 707/10 |
| 5,787,247 A | 7/1998 | Norin et al. | 395/200.5 |
| 5,787,262 A | 7/1998 | Shakib et al. | 395/200.35 |
| 5,794,228 A | 8/1998 | French et al. | 707/2 |
| 5,804,803 A | 9/1998 | Cragun et al. | 235/375 |
| 5,809,497 A | 9/1998 | Freund et al. | 707/2 |
| 5,812,773 A | 9/1998 | Norin | 395/200.34 |
| 5,812,793 A | 9/1998 | Shakib et al. | 395/200.31 |
| 5,818,437 A | 10/1998 | Grover et al. | 345/811 |
| 5,826,245 A | 10/1998 | Sandberg-Diment | 705/44 |
| 5,832,489 A | 11/1998 | Kucala | 707/10 |
| 5,832,518 A | 11/1998 | Mastors | 707/202 |
| 5,832,519 A | 11/1998 | Bowen et al. | 707/203 |
| 5,845,283 A | 12/1998 | Williams et al. | 707/101 |
| 5,859,973 A | 1/1999 | Carpenter | 395/200.33 |
| 5,864,864 A | 1/1999 | Lerner | 707/102 |
| 5,875,296 A | 2/1999 | Shi et al. | 395/188.01 |
| 5,884,323 A | 3/1999 | Hawkins et al. | 707/201 |
| 5,884,325 A | 3/1999 | Bauer et al. | 707/201 |
| 5,893,119 A | 4/1999 | Squibb | 707/203 |
| 5,896,321 A | 4/1999 | Miller et al. | 365/189.01 |
| 5,897,640 A | 4/1999 | Veghte et al. | 707/202 |
| 5,897,642 A | 4/1999 | Capossela et al. | 707/203 |
| 5,903,723 A | 5/1999 | Beck et al. | 709/203 |
| 5,907,793 A | 5/1999 | Reams | 455/3.1 |
| 5,923,756 A | 7/1999 | Shambroom | 713/156 |
| 5,923,848 A | 7/1999 | Goodhand et al. | 395/200.49 |
| 5,926,816 A | 7/1999 | Bauer et al. | 707/8 |
| 5,933,653 A | 8/1999 | Ofek | 395/826 |
| 5,933,778 A | 8/1999 | Buhrmann et al. | |
| 5,933,816 A | 8/1999 | Zeanah et al. | 705/35 |
| 5,935,262 A | 8/1999 | Barrett et al. | 714/46 |
| 5,937,405 A | 8/1999 | Campbell | 707/10 |
| 5,941,944 A * | 8/1999 | Messerly | 709/203 |
| 5,943,676 A | 8/1999 | Boothby | 707/201 |
| 5,944,787 A | 8/1999 | Zoken | 709/206 |
| 5,946,615 A | 8/1999 | Holmes et al. | 455/412 |
| 5,948,066 A | 9/1999 | Whalen et al. | 709/229 |
| 5,951,636 A | 9/1999 | Zerber | 709/202 |
| 5,961,572 A | 10/1999 | Craport et al. | 340/990 |
| 5,961,590 A | 10/1999 | Mendez et al. | 709/206 |
| 5,968,131 A | 10/1999 | Mendez et al. | 709/246 |
| 5,970,149 A | 10/1999 | Johnson | 714/46 |
| 5,970,490 A | 10/1999 | Morgenstern | 707/10 |
| 5,971,277 A | 10/1999 | Cragun et al. | 235/462.01 |
| 5,974,238 A | 10/1999 | Chase, Jr. | 395/200.78 |
| 5,974,563 A | 10/1999 | Beeler, Jr. | 714/5 |
| 5,987,381 A | 11/1999 | Oshizawa | 340/990 |
| 5,987,609 A | 11/1999 | Hasebe | 726/35 |
| 5,995,118 A | 11/1999 | Masuda | 345/467 |
| 6,000,000 A | 12/1999 | Hawkins et al. | 707/201 |
| 6,006,215 A | 12/1999 | Retallick | 707/2 |
| 6,006,274 A | 12/1999 | Hawkins et al. | 709/248 |
| 6,009,462 A | 12/1999 | Birrell et al. | 709/206 |
| 6,012,063 A | 1/2000 | Bodnar | 707/101 |
| 6,012,088 A | 1/2000 | Li et al. | 709/219 |
| 6,014,695 A | 1/2000 | Yamashita et al. | 709/219 |
| 6,016,394 A | 1/2000 | Walker | 717/104 |
| 6,016,478 A | 1/2000 | Zhang et al. | 705/9 |
| 6,023,708 A | 2/2000 | Mendez et al. | 707/203 |
| 6,023,723 A | 2/2000 | McCormick et al. | 709/206 |
| 6,026,414 A | 2/2000 | Anglin | 707/204 |
| 6,034,621 A | 3/2000 | Kaufman | 340/825.44 |
| 6,038,665 A | 3/2000 | Bolt et al. | 713/176 |
| 6,044,381 A | 3/2000 | Boothby et al. | 707/201 |
| 6,049,776 A | 4/2000 | Donnelly et al. | 705/8 |
| 6,052,735 A | 4/2000 | Ulrich et al. | 709/236 |
| 6,058,399 A | 5/2000 | Morag et al. | 707/201 |
| 6,061,790 A | 5/2000 | Bodnar | 713/171 |
| 6,061,796 A | 5/2000 | Chen et al. | 713/201 |
| 6,063,134 A | 5/2000 | Peters et al. | |
| 6,064,880 A | 5/2000 | Alanara | 455/419 |
| 6,065,018 A | 5/2000 | Beier et al. | 707/202 |
| 6,073,133 A | 6/2000 | Chrabaszcz | 707/10 |
| 6,076,109 A | 6/2000 | Kikinis | 709/228 |
| 6,078,960 A | 6/2000 | Ballard | 709/229 |
| 6,081,900 A | 6/2000 | Subramaniam et al. | |
| 6,094,618 A | 7/2000 | Harada | 701/207 |
| 6,101,480 A | 8/2000 | Conmy et al. | 705/9 |
| 6,108,330 A * | 8/2000 | Bhatia et al. | 370/352 |
| 6,108,703 A * | 8/2000 | Leighton et al. | 709/226 |
| 6,112,024 A | 8/2000 | Almond et al. | |
| 6,115,797 A | 9/2000 | Kanda et al. | |
| 6,131,096 A | 10/2000 | Ng et al. | 707/10 |
| 6,131,116 A | 10/2000 | Riggins et al. | 709/219 |
| 6,141,011 A | 10/2000 | Bodnar et al. | 345/357 |
| 6,141,621 A | 10/2000 | Piwowarski et al. | 340/989 |
| 6,141,659 A | 10/2000 | Barker et al. | 707/102 |
| 6,141,664 A | 10/2000 | Boothby | 707/201 |
| 6,145,088 A | 11/2000 | Stevens | |
| 6,148,260 A | 11/2000 | Musk et al. | 701/200 |
| 6,151,606 A | 11/2000 | Mendez | 707/201 |
| 6,157,630 A | 12/2000 | Adler et al. | 370/310 |
| 6,163,773 A | 12/2000 | Kishi | 706/16 |
| 6,163,779 A * | 12/2000 | Mantha et al. | 707/100 |
| 6,163,844 A * | 12/2000 | Duncan et al. | 726/3 |

| Patent | Type | Date | Inventor | Class |
|---|---|---|---|---|
| 6,167,120 | A | 12/2000 | Kikinis | 379/90.01 |
| 6,173,310 | B1 | 1/2001 | Yost et al. | 709/201 |
| 6,173,311 | B1 | 1/2001 | Hassett et al. | 709/202 |
| 6,182,117 | B1 | 1/2001 | Christie et al. | 709/205 |
| 6,182,141 | B1* | 1/2001 | Blum et al. | 709/227 |
| 6,185,598 | B1* | 2/2001 | Farber et al. | 709/200 |
| 6,189,030 | B1* | 2/2001 | Kirsch et al. | 709/224 |
| 6,189,096 | B1 | 2/2001 | Haverty | 713/155 |
| 6,195,695 | B1 | 2/2001 | Cheston et al. | 709/221 |
| 6,195,794 | B1 | 2/2001 | Buxton | 717/11 |
| 6,202,085 | B1 | 3/2001 | Benson et al. | 709/205 |
| 6,205,448 | B1 | 3/2001 | Kruglikov et al. | 707/200 |
| 6,209,034 | B1 | 3/2001 | Gladwin et al. | |
| 6,212,529 | B1 | 4/2001 | Boothby et al. | 707/201 |
| 6,212,556 | B1 | 4/2001 | Arunachalam | |
| 6,216,131 | B1 | 4/2001 | Liu et al. | 707/102 |
| 6,219,680 | B1 | 4/2001 | Bernardo et al. | 707/501 |
| 6,219,694 | B1 | 4/2001 | Lazaridis et al. | 709/206 |
| 6,223,187 | B1 | 4/2001 | Boothby et al. | 707/201 |
| 6,226,650 | B1 | 5/2001 | Mahajan et al. | 707/201 |
| 6,233,565 | B1 | 5/2001 | Lewis et al. | 705/35 |
| 6,233,589 | B1 | 5/2001 | Balcha et al. | 707/203 |
| 6,243,760 | B1* | 6/2001 | Armbruster et al. | 709/243 |
| 6,247,048 | B1 | 6/2001 | Greer et al. | 709/219 |
| 6,247,135 | B1 | 6/2001 | Feague | 713/400 |
| 6,249,690 | B1 | 6/2001 | Mashiko | |
| 6,252,547 | B1 | 6/2001 | Perry et al. | 342/357.06 |
| 6,255,989 | B1 | 7/2001 | Munson et al. | 342/357.13 |
| 6,256,750 | B1 | 7/2001 | Takeda | 714/11 |
| 6,260,124 | B1 | 7/2001 | Crockett et al. | 711/122 |
| 6,272,545 | B1 | 8/2001 | Flanagin et al. | 709/228 |
| 6,275,831 | B1 | 8/2001 | Bodnar et al. | 707/201 |
| 6,278,941 | B1 | 8/2001 | Yokoyama | 701/209 |
| 6,282,435 | B1 | 8/2001 | Wagner et al. | 455/566 |
| 6,282,698 | B1 | 8/2001 | Baker et al. | 717/1 |
| 6,285,889 | B1 | 9/2001 | Nykanen et al. | 455/557 |
| 6,286,029 | B1* | 9/2001 | Delph | 709/203 |
| 6,286,053 | B1 | 9/2001 | Van Peursem et al. | 709/999.999 |
| 6,286,085 | B1 | 9/2001 | Jouenne et al. | 711/162 |
| 6,292,743 | B1 | 9/2001 | Pu et al. | 455/456 |
| 6,292,905 | B1 | 9/2001 | Wallach et al. | 714/4 |
| 6,295,502 | B1 | 9/2001 | Hancock et al. | 701/201 |
| 6,295,541 | B1 | 9/2001 | Bodnar et al. | 707/203 |
| 6,304,881 | B1 | 10/2001 | Halim et al. | 707/201 |
| 6,317,755 | B1 | 11/2001 | Rakers et al. | 707/204 |
| 6,321,236 | B1 | 11/2001 | Zollinger et al. | 707/201 |
| 6,324,467 | B1 | 11/2001 | Machii et al. | 701/200 |
| 6,324,526 | B1 | 11/2001 | D'Agostino | 705/44 |
| 6,324,544 | B1 | 11/2001 | Alam et al. | 707/201 |
| 6,327,533 | B1 | 12/2001 | Chou | 340/988 |
| 6,329,680 | B1 | 12/2001 | Yoshida et al. | 257/296 |
| 6,330,568 | B1 | 12/2001 | Boothby et al. | 707/201 |
| 6,332,158 | B1* | 12/2001 | Risley et al. | 709/219 |
| 6,333,973 | B1 | 12/2001 | Smith et al. | 379/88.12 |
| 6,338,096 | B1* | 1/2002 | Ukelson | 719/319 |
| 6,339,710 | B1 | 1/2002 | Suzuki | 455/458 |
| 6,341,316 | B1 | 1/2002 | Kloba et al. | 709/248 |
| 6,345,308 | B1 | 2/2002 | Abe | 709/248 |
| 6,349,336 | B1* | 2/2002 | Sit et al. | 709/227 |
| 6,353,448 | B1 | 3/2002 | Scarborough et al. | 345/349 |
| 6,356,910 | B1* | 3/2002 | Zellweger | 707/100 |
| 6,356,961 | B1 | 3/2002 | Oprescu-Surcobe | |
| 6,360,252 | B1 | 3/2002 | Rudy et al. | 709/206 |
| 6,360,330 | B1 | 3/2002 | Mutalik et al. | 714/4 |
| 6,363,249 | B1 | 3/2002 | Nordeman et al. | 455/418 |
| 6,363,412 | B1 | 3/2002 | Niwa et al. | 709/203 |
| 6,374,250 | B2 | 4/2002 | Ajtai et al. | 707/101 |
| 6,381,700 | B1 | 4/2002 | Yoshida | 713/201 |
| 6,389,462 | B1* | 5/2002 | Cohen et al. | 709/218 |
| 6,396,482 | B1 | 5/2002 | Griffin et al. | 345/169 |
| 6,397,307 | B2 | 5/2002 | Ohran | 711/161 |
| 6,397,351 | B1 | 5/2002 | Miller et al. | 714/13 |
| 6,401,104 | B1 | 6/2002 | LaRue et al. | 707/203 |
| 6,405,218 | B1 | 6/2002 | Boothby | 707/201 |
| 6,418,309 | B1 | 7/2002 | Moon et al. | 455/418 |
| 6,434,627 | B1* | 8/2002 | Millet et al. | 709/245 |
| 6,437,818 | B1 | 8/2002 | Ludwig et al. | 348/14.09 |
| 6,449,622 | B1 | 9/2002 | LaRue et al. | 707/201 |
| 6,453,392 | B1 | 9/2002 | Flynn, Jr. | 711/151 |
| 6,457,062 | B1 | 9/2002 | Pivowar et al. | 709/248 |
| 6,460,036 | B1 | 10/2002 | Herz | 707/10 |
| 6,462,644 | B1 | 10/2002 | Howell et al. | |
| 6,463,464 | B1* | 10/2002 | Lazaridis et al. | 709/207 |
| 6,466,967 | B2* | 10/2002 | Landsman et al. | 709/203 |
| 6,473,621 | B1 | 10/2002 | Heie | 455/466 |
| 6,480,896 | B1 | 11/2002 | Brown et al. | 709/231 |
| 6,484,143 | B1* | 11/2002 | Swildens et al. | 705/1 |
| 6,487,560 | B1 | 11/2002 | LaRue et al. | 707/203 |
| 6,490,655 | B1 | 12/2002 | Kershaw | 711/151 |
| 6,496,944 | B1 | 12/2002 | Hsiao et al. | 714/15 |
| 6,499,108 | B1 | 12/2002 | Johnson | 713/201 |
| 6,507,891 | B1* | 1/2003 | Challenger et al. | 711/122 |
| 6,516,327 | B1 | 2/2003 | Zondervan et al. | 707/200 |
| 6,519,452 | B1 | 2/2003 | Agostino et al. | |
| 6,523,063 | B1* | 2/2003 | Miller et al. | 709/206 |
| 6,523,079 | B2 | 2/2003 | Kikinis et al. | 710/303 |
| 6,532,588 | B1 | 3/2003 | Porter | |
| 6,535,743 | B1 | 3/2003 | Kennedy et al. | 455/456.1 |
| 6,539,494 | B1 | 3/2003 | Abramson et al. | 714/4 |
| 6,542,933 | B1 | 4/2003 | Durst, Jr. et al. | 709/229 |
| 6,546,425 | B1 | 4/2003 | Hanson et al. | 709/227 |
| 6,549,933 | B1 | 4/2003 | Barrett et al. | 709/203 |
| 6,553,375 | B1 | 4/2003 | Huang et al. | 707/10 |
| 6,553,410 | B2 | 4/2003 | Kikinis | 709/218 |
| 6,553,413 | B1* | 4/2003 | Lewin et al. | 709/219 |
| 6,567,850 | B1 | 5/2003 | Freishtat et al. | 709/224 |
| 6,567,857 | B1* | 5/2003 | Gupta et al. | 709/238 |
| 6,581,065 | B1* | 6/2003 | Rodkin et al. | 707/102 |
| 6,584,454 | B1 | 6/2003 | Hummel et al. | 705/59 |
| 6,589,290 | B1 | 7/2003 | Maxwell et al. | 707/507 |
| 6,591,266 | B1* | 7/2003 | Li et al. | 707/10 |
| 6,591,306 | B1* | 7/2003 | Redlich | 709/245 |
| 6,591,362 | B1 | 7/2003 | Li | 713/1 |
| 6,597,700 | B2* | 7/2003 | Golikeri et al. | 370/401 |
| 6,601,143 | B1 | 7/2003 | Lamparter | |
| 6,609,005 | B1 | 8/2003 | Chern | 455/457 |
| 6,636,894 | B1 | 10/2003 | Short et al. | 709/225 |
| 6,640,302 | B1* | 10/2003 | Subramaniam et al. | 713/169 |
| 6,643,707 | B1* | 11/2003 | Booth | 709/245 |
| 6,647,399 | B2 | 11/2003 | Zaremba | |
| 6,654,746 | B1 | 11/2003 | Wong et al. | 707/10 |
| 6,665,721 | B1* | 12/2003 | Hind et al. | 709/227 |
| 6,671,724 | B1* | 12/2003 | Pandya et al. | 709/226 |
| 6,671,757 | B1 | 12/2003 | Multer et al. | 710/100 |
| 6,684,206 | B2 | 1/2004 | Chen et al. | 706/61 |
| 6,684,302 | B2 | 1/2004 | Kershaw | 711/151 |
| 6,694,335 | B1 | 2/2004 | Hopmann et al. | 707/200 |
| 6,694,336 | B1 | 2/2004 | Multer et al. | 707/100 |
| 6,701,316 | B1* | 3/2004 | Li et al. | 707/10 |
| 6,704,849 | B2 | 3/2004 | Steegmans | 711/162 |
| 6,714,987 | B1* | 3/2004 | Amin et al. | 709/249 |
| 6,718,348 | B1 | 4/2004 | Novak et al. | 707/201 |
| 6,718,390 | B1* | 4/2004 | Still et al. | 709/229 |
| 6,725,239 | B2 | 4/2004 | Sherman et al. | 707/201 |
| 6,728,530 | B1 | 4/2004 | Heinonen et al. | 455/414.1 |
| 6,732,101 | B1* | 5/2004 | Cook | 707/10 |
| 6,732,264 | B1 | 5/2004 | Sun et al. | 713/2 |
| 6,738,789 | B2 | 5/2004 | Multer et al. | 707/201 |
| 6,741,851 | B1 | 5/2004 | Lee et al. | |
| 6,745,040 | B2 | 6/2004 | Zimmerman | 455/458 |
| 6,757,696 | B2 | 6/2004 | Multer et al. | 707/201 |
| 6,757,698 | B2 | 6/2004 | McBride et al. | 707/204 |
| 6,757,712 | B1 | 6/2004 | Bastian et al. | 709/206 |
| 6,781,575 | B1 | 8/2004 | Hawkins et al. | 345/173 |
| 6,795,848 | B1* | 9/2004 | Border et al. | 709/213 |

| | | | |
|---|---|---|---|
| 6,799,214 B1 * | 9/2004 | Li | 709/226 |
| 6,804,690 B1 | 10/2004 | Dysert et al. | 707/204 |
| 6,804,783 B1 * | 10/2004 | Wesinger et al. | 726/11 |
| 6,810,411 B1 * | 10/2004 | Coughlin et al. | 709/203 |
| 6,812,961 B1 | 11/2004 | Parulski et al. | 348/231.2 |
| 6,813,487 B1 | 11/2004 | Trommelen | |
| 6,816,481 B1 | 11/2004 | Adams et al. | 370/352 |
| 6,829,654 B1 * | 12/2004 | Jungck | 709/246 |
| 6,836,657 B2 | 12/2004 | Ji et al. | |
| 6,836,765 B1 | 12/2004 | Sussman | 705/41 |
| 6,839,568 B2 | 1/2005 | Suzuki | 455/550.1 |
| 6,842,695 B1 | 1/2005 | Tu et al. | 701/213 |
| 6,850,944 B1 | 2/2005 | MacCall et al. | 707/100 |
| 6,868,451 B1 | 3/2005 | Peacock | 709/231 |
| 6,870,921 B1 | 3/2005 | Elsey et al. | 379/218.01 |
| 6,886,013 B1 * | 4/2005 | Beranek | 707/10 |
| 6,892,225 B1 | 5/2005 | Tu et al. | 709/217 |
| 6,892,245 B1 * | 5/2005 | Crump et al. | 709/245 |
| 6,904,449 B1 | 6/2005 | Quinones | |
| 6,904,460 B1 * | 6/2005 | Raciborski et al. | 709/224 |
| 6,920,488 B1 | 7/2005 | Le Pennec et al. | 709/219 |
| 6,925,476 B1 | 8/2005 | Multer | 707/200 |
| 6,925,477 B1 | 8/2005 | Champagne et al. | 707/203 |
| 6,934,767 B1 | 8/2005 | Jellinek | 709/247 |
| 6,944,651 B2 | 9/2005 | Onyon et al. | 709/217 |
| 6,944,676 B1 * | 9/2005 | Armbruster et al. | 709/243 |
| 6,954,660 B2 | 10/2005 | Aoyama | |
| 6,954,783 B1 * | 10/2005 | Bodwell et al. | 709/218 |
| 6,963,914 B1 * | 11/2005 | Breitbart et al. | 709/226 |
| 6,973,299 B2 | 12/2005 | Apfel | |
| 6,996,617 B1 * | 2/2006 | Aiken et al. | 709/227 |
| 6,996,631 B1 * | 2/2006 | Aiken et al. | 709/242 |
| 7,003,555 B1 * | 2/2006 | Jungck | 709/219 |
| 7,003,668 B2 | 2/2006 | Berson et al. | 713/182 |
| 7,007,041 B2 | 2/2006 | Multer et al. | 707/201 |
| 7,010,578 B1 * | 3/2006 | Lewin et al. | 709/217 |
| 7,016,964 B1 * | 3/2006 | Still et al. | 709/229 |
| 7,023,868 B2 * | 4/2006 | Rabenko et al. | 370/419 |
| 7,035,878 B1 | 4/2006 | Multer et al. | 707/201 |
| 7,039,656 B1 | 5/2006 | Tsai et al. | 707/201 |
| 7,051,275 B2 | 5/2006 | Gupta et al. | 715/512 |
| 7,054,594 B2 | 5/2006 | Bloch et al. | 455/41.2 |
| 7,054,952 B1 * | 5/2006 | Schwerdtfeger et al. | 709/246 |
| 7,082,476 B1 * | 7/2006 | Cohen et al. | 709/246 |
| 7,085,817 B1 * | 8/2006 | Tock et al. | 709/217 |
| 7,096,418 B1 * | 8/2006 | Singhal et al. | 715/205 |
| 7,099,915 B1 * | 8/2006 | Tenereillo et al. | 709/203 |
| 7,103,794 B2 * | 9/2006 | Malcolm et al. | 714/4 |
| 7,107,043 B2 | 9/2006 | Aoyama | |
| 7,110,954 B2 | 9/2006 | Yung et al. | |
| 7,116,681 B1 * | 10/2006 | Hovell et al. | 370/466 |
| 7,146,161 B2 | 12/2006 | Chou | |
| 7,162,494 B2 | 1/2007 | Arellano | 707/104.1 |
| 7,167,728 B1 | 1/2007 | Wagner et al. | 455/566 |
| 7,181,628 B2 | 2/2007 | Sato et al. | |
| 7,197,574 B1 * | 3/2007 | Ishiyama | 709/245 |
| 7,233,791 B2 | 6/2007 | Gilbert et al. | 455/419 |
| 7,249,175 B1 * | 7/2007 | Donaldson | 709/225 |
| 7,269,433 B2 | 9/2007 | Vargas et al. | 455/502 |
| 7,284,051 B1 * | 10/2007 | Okano et al. | 709/226 |
| 7,289,964 B1 * | 10/2007 | Bowman-Amuah | 705/1 |
| 7,293,074 B1 | 11/2007 | Jellinek et al. | 709/205 |
| 7,315,826 B1 | 1/2008 | Guheen et al. | 705/7 |
| 7,317,907 B2 | 1/2008 | Linkert et al. | |
| 7,343,568 B2 | 3/2008 | Jiang et al. | |
| 7,349,719 B2 | 3/2008 | Buniatyan | |
| 7,356,559 B1 * | 4/2008 | Jacobs et al. | 709/203 |
| 7,363,233 B1 * | 4/2008 | Levine | 705/1 |
| 7,383,061 B1 | 6/2008 | Hawkins | |
| 7,392,034 B2 * | 6/2008 | Westman et al. | 455/402 |
| 7,415,486 B2 | 8/2008 | Multer et al. | 709/201 |
| 7,440,746 B1 | 10/2008 | Swan | |
| 7,447,743 B1 | 11/2008 | Jordan, Jr. | 709/206 |
| 7,454,500 B1 * | 11/2008 | Hsu et al. | 709/226 |
| 7,499,888 B1 | 3/2009 | Tu et al. | 705/44 |
| 7,505,762 B2 | 3/2009 | Onyon et al. | 455/419 |
| 7,519,702 B1 * | 4/2009 | Allan | 709/224 |
| 7,596,609 B1 * | 9/2009 | Refuah et al. | 709/218 |
| 2001/0014893 A1 | 8/2001 | Boothby | 707/201 |
| 2001/0028363 A1 | 10/2001 | Nomoto et al. | |
| 2001/0044805 A1 | 11/2001 | Multer et al. | 707/201 |
| 2001/0047471 A1 | 11/2001 | Johnson | 713/1 |
| 2001/0051920 A1 | 12/2001 | Joao et al. | 705/41 |
| 2002/0007303 A1 | 1/2002 | Brokler et al. | 705/10 |
| 2002/0010868 A1 | 1/2002 | Nakashima et al. | 713/201 |
| 2002/0016818 A1 | 2/2002 | Kirani et al. | 709/206 |
| 2002/0016912 A1 | 2/2002 | Johnson | 713/165 |
| 2002/0032751 A1 | 3/2002 | Bharadwaj | 709/218 |
| 2002/0040369 A1 | 4/2002 | Multer et al. | 707/200 |
| 2002/0049852 A1 | 4/2002 | Lee et al. | 709/231 |
| 2002/0055909 A1 | 5/2002 | Fung et al. | 705/42 |
| 2002/0056011 A1 | 5/2002 | Nardone et al. | 709/248 |
| 2002/0059116 A1 | 5/2002 | Bulatovic et al. | 705/27 |
| 2002/0067816 A1 | 6/2002 | Bushnell | |
| 2002/0078075 A1 | 6/2002 | Colson et al. | 707/204 |
| 2002/0082995 A1 | 6/2002 | Christie | 705/44 |
| 2002/0116444 A1 * | 8/2002 | Chaudhri et al. | 709/201 |
| 2002/0162011 A1 | 10/2002 | Tanaka et al. | 713/200 |
| 2002/0168964 A1 | 11/2002 | Kraft | |
| 2003/0028451 A1 | 2/2003 | Ananian | 705/27 |
| 2003/0037020 A1 | 2/2003 | Novak et al. | 707/1 |
| 2003/0069874 A1 | 4/2003 | Hertzog et al. | 707/1 |
| 2003/0204568 A1 | 10/2003 | Bhargava et al. | 709/206 |
| 2003/0229898 A1 | 12/2003 | Babu et al. | 725/87 |
| 2004/0054746 A1 | 3/2004 | Shibata | 709/207 |
| 2004/0093385 A1 | 5/2004 | Yamagata | 709/206 |
| 2004/0111465 A1 | 6/2004 | Chuang et al. | 709/203 |
| 2004/0204120 A1 | 10/2004 | Jiles | |
| 2004/0224665 A1 | 11/2004 | Kokubo | 455/411 |
| 2005/0086296 A1 | 4/2005 | Chi et al. | 709/203 |
| 2005/0090253 A1 | 4/2005 | Kim et al. | 455/435.1 |
| 2006/0190626 A1 | 8/2006 | Bhogal et al. | 709/248 |
| 2006/0212482 A1 | 9/2006 | Celik | |
| 2007/0050734 A1 | 3/2007 | Busey | 715/853 |
| 2008/0009268 A1 | 1/2008 | Ramer et al. | |
| 2008/0022220 A1 | 1/2008 | Cheah | 715/769 |
| 2008/0039020 A1 | 2/2008 | Eskin | 455/41.2 |

FOREIGN PATENT DOCUMENTS

| | | |
|---|---|---|
| CN | 1313697 A | 2/2005 |
| EP | 0801487 | 10/1997 |
| EP | 0801487 A2 | 10/1997 |
| EP | 0836131 A2 | 4/1998 |
| EP | 0836301 A | 4/1998 |
| EP | 0924917 A2 | 6/1999 |
| EP | 0930593 A | 7/1999 |
| EP | 1024441 A2 | 2/2000 |
| EP | 0986225 A1 | 3/2000 |
| JP | 10191453 | 7/1998 |
| JP | 1998-106683 | 12/1998 |
| JP | 11242620 | 9/1999 |
| JP | 11242677 | 9/1999 |
| WO | WO 97/39564 | 10/1997 |
| WO | WO 97/41520 | 11/1997 |
| WO | WO 98/03005 | 1/1998 |
| WO | WO 98/21648 | 5/1998 |
| WO | WO 98/29994 A | 7/1998 |
| WO | WO 99/36870 | 7/1999 |
| WO | WO 99/40514 | 8/1999 |
| WO | WO 99/45451 | 9/1999 |
| WO | WO 99/45484 | 9/1999 |
| WO | WO 99/46701 A | 9/1999 |
| WO | WO 99/50761 | 10/1999 |
| WO | WO 99/65256 | 12/1999 |
| WO | WO 00/11832 | 3/2000 |

| | | |
|---|---|---|
| WO | WO 00/16222 | 3/2000 |
| WO | WO 00/29998 | 5/2000 |
| WO | 0133874 A1 | 5/2001 |
| WO | 0217140 A2 | 2/2002 |
| WO | 03-083716 A1 | 10/2003 |

OTHER PUBLICATIONS

Chase, Larry, "Taking Transactions Online,"Oct. 1998, pp. 124-132, Target Marketing, v.21 No. 10.

Gong, Li, "Increasing Availability and Security of an Authentication Service," Jun. 1993, pp. 657-662, IEEE Journal on Selected Areas in Communications, v. 11 No. 5.

DeMaio, Harry B., "My MIPS Are Sealed," Sep./Oct. 1993, pp. 46-51, Chief Information Officer Journal, v. 5 iss.7.

Internet Mail Consortium: :vCard Overview, Oct. 13, 1998, 3 pages, Retrieved from the Internet: www.imc.org/pdi/vcardoverview.

Internet Mail Consortium: :vCard the Electronic Business Card, Jan. 1, 1997, 5 pages, Retrieved from the Internet: www.imc.org/pdi/vcardwhite.html.

BusinessWire, "FusionOne Partners with WhitePages.com to Deliver Automatic Synchronization for Online Subscriber,"press release, Oct. 11, 2000.

Malone, et al., Semi-Structured Messages are Surprisingly Useful for Computer-Supported Coordination, Proceedings of the Conference on Computer-Supported Cooperative Work, Austin, Texas, Dec. 3-5, 1986, pp. 1-26.

Patel et al.,"The Multimedia Fax-MIME Gateway," 8440 IEEE MultiMedia No. 4, Jan. 1994, 7 pgs.

Lamb et al.,"LAN-Based Office for the Enterprise, A Case Study," Advantis Company, White Plains, NY 10605, Jan. 1994 IEEE, pp. 440- 447.

Rou et al., "Online File Storage System,"2002 Student Conference on Research and Development Proceedings, Shah Alam, Malaysia, Nov. 7, 2002, IEEE, pp. 83-86.

Agarwal et al., "On the Scalability of Data Synchronization Protocols for PDAs and Mobile Devices," Jul. 2002, IEEE Network, pp. 22-28.

\* cited by examiner

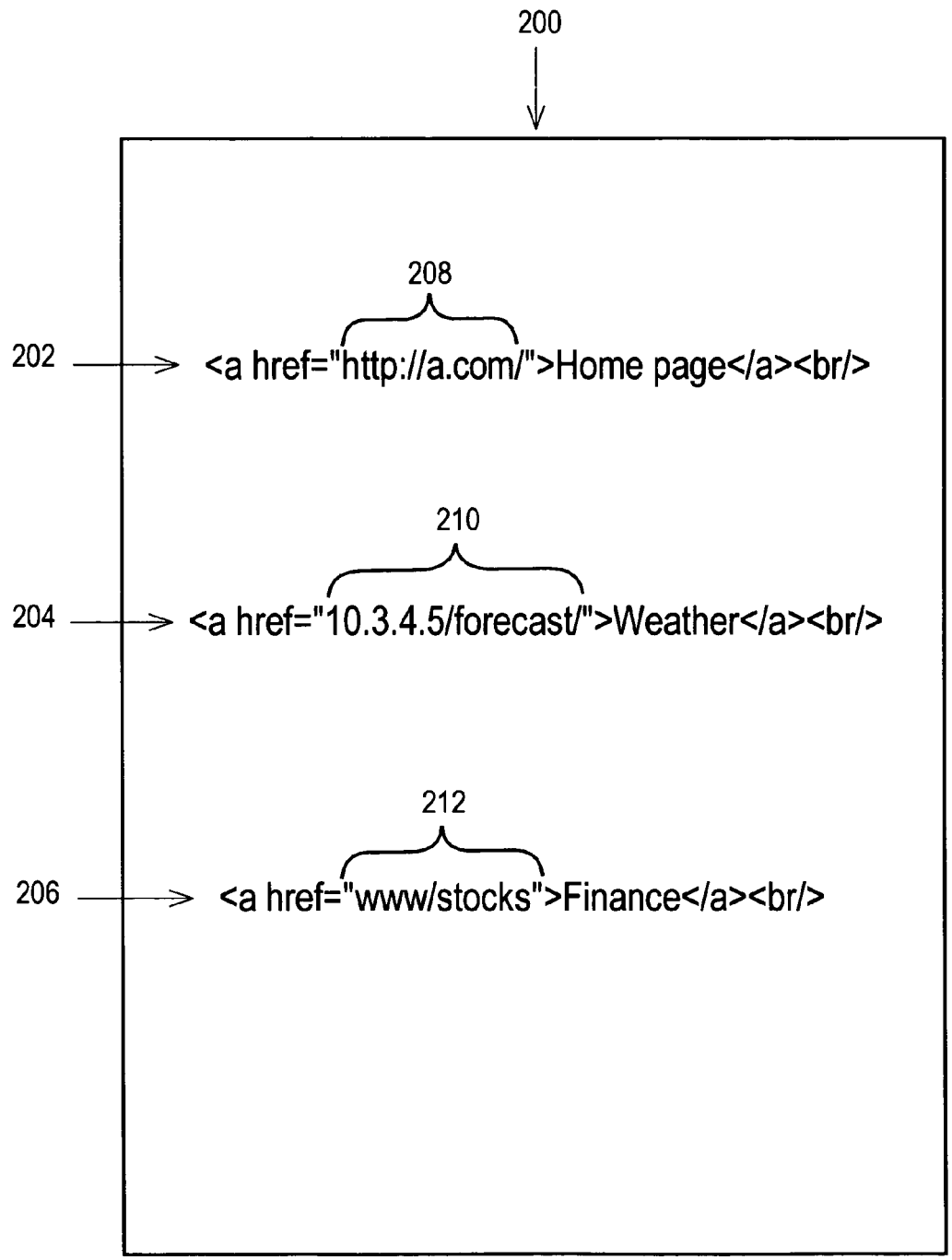

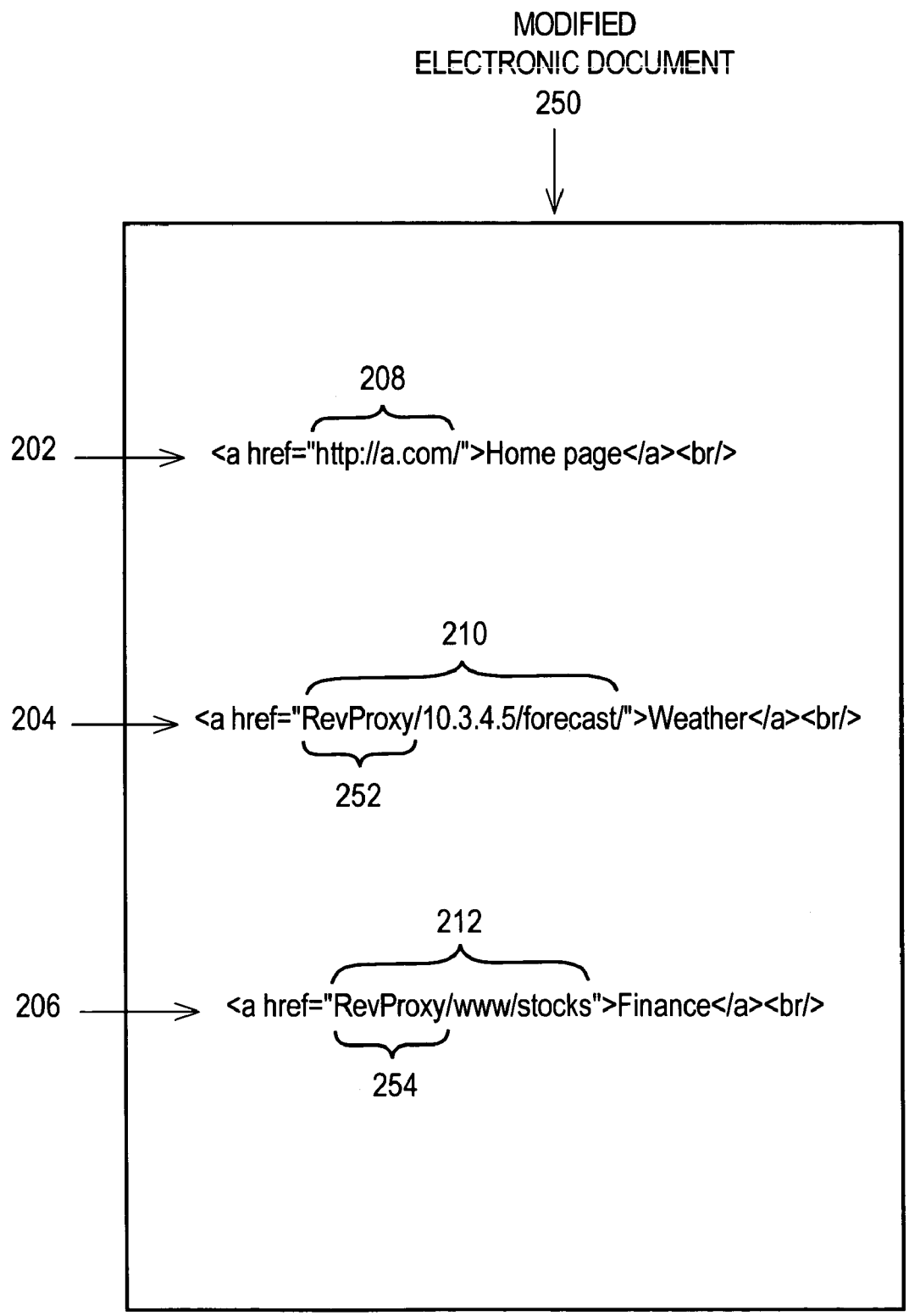

FIG. 2D

290 → `<a href="http://www.company.com/RevProxy/http://10.3.4.5/forecast/">Weather</a><br/>`

292 spans `http://www.company.com/RevProxy/http://10.3.4.5/forecast/"`
294 spans `http://www.company.com/RevProxy/`
296 spans `http://10.3.4.5/forecast/"`

REVERSE PROXY MECHANISM FOR RETRIEVING ELECTRONIC CONTENT ASSOCIATED WITH A LOCAL NETWORK

COPYRIGHT AUTHORIZATION

A portion of the disclosure of this patent document contains material which is subject to copyright protection. The copyright owner has no objection to the facsimile reproduction by any one of the patent disclosures, as it appears in the U.S. Patent & Trademark Office patent files or records, but otherwise reserves all copyright rights whatsoever.

FIELD OF THE INVENTION

The present invention relates generally to the processing of electronic content requests, and more specifically, to a reverse proxy mechanism for retrieving electronic content that is associated with a local network.

BACKGROUND OF THE INVENTION

Society has become extremely dependent upon computers and the electronic content that they contain. As used herein, the term electronic content is broadly defined to include any form or type information that may be electronically read by a computer. For example, the term electronic content includes, but is not limited to, emails, calendar information, word processing documents, pictures, news articles, television programming information, or any other type of information that may be electronically read by a computer. The electronic content may exist in a variety of different content formats, that includes but is not limited to HTML, XML, WML, Microsoft Word®, WordPerfect®, JPEG, GIF, or any other format that can be electronically read by a computer.

Recently, a movement has been made to allow users to remotely access this electronic content information through the use of "highly constrained" devices (e.g., cellular phones, Palm Pilots, PDAs, etc.). For example, Sinia Corporation has developed a product that provides users with the flexibility to remotely connect to a local network (for example, a company's private network) via a Highly Constrained device and to retrieve the user's email and calendar information from potentially anywhere in the world.

Currently, in addition to retrieving electronic content information, there is need to allow users to access the information that is associated with a link within electronic content. For example, in the Web environment, electronic content often includes links (often generally referred to a hypertext links) that are associated with other electronic content. By selecting a particular link within an electronic content, the user's browser automatically communicates with an Internet Domain Name Service (DNS server) to resolve the address of the electronic content and to request the content from a server that is associated with the resolved address.

However, if a link is associated with an electronic content whose address cannot be resolved by an Internet DNS server, for example electronic content that is stored on a local network, the user's browser will not be provided with the correct address of the electronic content and thus will have no way of retrieving the content.

For example, many companies maintain their own local networks, often referred to as local intranets. These local networks provide a means for managing and controlling access to the company's electronic content information from the outside world. For in many local networks, a local DNS server is used to dynamically allocate IP addresses for accessing the local servers that manage a company's electronic content information. Because the IP addresses are only known within the local network, a DNS server outside the local network cannot resolve the address of a link that is associated with an electronic content that is stored within one of the local network servers. Thus, if after remotely retrieving electronic content the user selects a link within the content that is associated with electronic content stored on a local network, the Internet DNS server will not be able to correctly resolve the address of that content, thus causing the user's browser to indicate that the electronic content could not be found or alternatively to provide other, incorrect content based on a "best" guess by the Internet DNS server.

Moreover, local network servers are often assigned local host names that are not known outside the local network. If a user using a highly constrained device selects a link that is associated with a local host name that is not known outside the local network, the Internet DNS server will again not be able to resolve the address of the link and therefore will not be able to retrieve the correct content.

Based on the foregoing, there is a clear need for a mechanism that allows users to remotely access electronic content and to select links within the content to retrieve locally stored content that is associated with a company's local network.

SUMMARY OF THE INVENTION

A method and apparatus are provided for processing requests for delivery of electronic content. According to one aspect of the invention, a request for delivery of first electronic content is received, where (1) the request is for delivery of the first electronic content to a destination client that is not on a local network, and (2) the first electronic content includes one or more links that are only resolvable within the local network. In response to the request, the first electronic content is retrieved, and first updated content is generated by modifying the one or more links associated with the first electronic content to include information identifying a server that can be addressed outside the local network. The first updated content is then delivered to the destination client.

According to one aspect of the invention, when a user of the destination client selects one of the modified links, the server information in the modified link causes a message to be sent to the server. If the server is within the local network, then the server may respond to the message by retrieving and delivering second electronic content that was associated with the link before the link was modified. If the server is outside the local network, then the server may send a message to another server within the local network to retrieve and deliver the second electronic content that was associated with the link before the link was modified. Links within the second electronic content may be modified in the same manner as were the links in the first electronic content.

The invention also encompasses a computer-readable medium, a computer data signal embodied in a carrier wave, and an apparatus configured to carry out the foregoing steps. Other features and aspects will become apparent from the following description and the appended claims.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A illustrates an electronic document that includes links that are not resolvable outside the local network;

FIG. 2B illustrates a modified electronic document in which the links have been updated to be resolvable outside the local network;

FIG. 2D illustrates an example of a link that may be sent to the reverse proxy server to initiate the process of providing access to locally stored electronic content;

DETAILED DESCRIPTION OF THE PREFERRED EMBODIMENT

A reverse proxy mechanism is provided for retrieving electronic content that is associated with a local network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

A reverse proxy mechanism is provided for retrieving, from outside a local network, electronic content that is associated with a local network. In one embodiment, a reverse proxy server is connected to a company's local network and configured to receive and resolve requests from clients outside the local network for locally stored electronic content. In response to receiving a request for electronic content that is associated with the local network, the reverse proxy server retrieves the content and generates a set of updated content by modifying the links associated with the electronic content to include information that identifies the reverse proxy server. The updated content is then delivered to the requesting client. By modifying the links to include information that identifies the reverse proxy server, when the user subsequently selects a link within the modified content, the reverse proxy server is guaranteed to receive the request. Thereafter, the reverse proxy server resolves the address of the content associated with the link, retrieves the content at that address, and again generates updated content by again modifying the links associated with that electronic content to include information that identifies the reverse proxy server. This process may be performed repeatedly to provide remote access to the locally stored electronic content.

Figure 1:
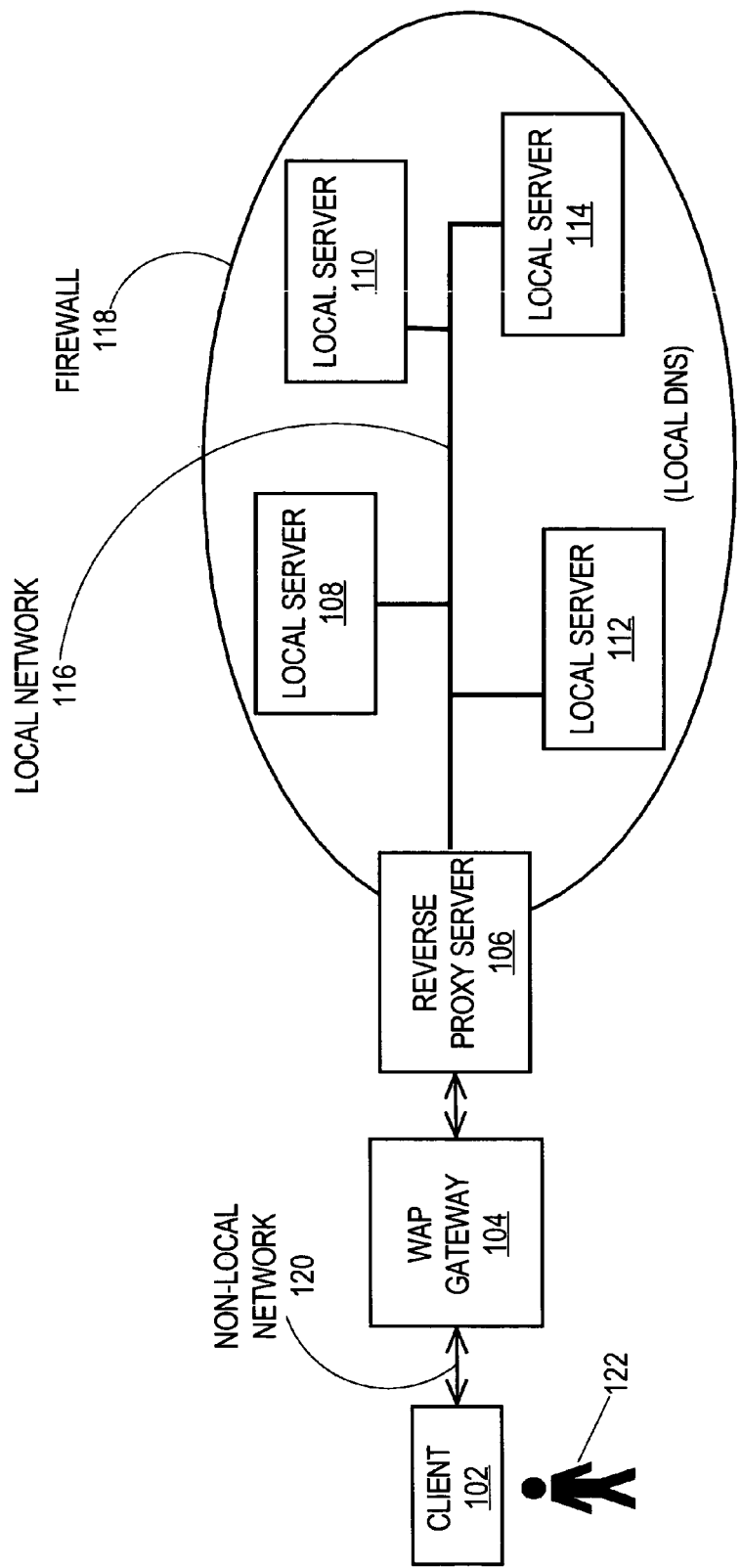
FIG. 1 illustrates a block diagram of a reverse proxy mechanism in which the present invention may be utilized.

FIG. 1 is a block diagram of a reverse proxy system 100 upon which certain embodiments of the invention may be implemented. Generally, system 100 includes a client 102, a Wireless Access Protocol (WAP) Gateway 104, a reverse proxy server 106, one or more local servers 108-114, a non-local network 120, a local network 116 and a firewall 118.

Local network 116 is a network system comprising any number of network devices (e.g., servers, personal computers, workstations, printers, etc.). Local Network 116 may form part of a private LAN or WAN that is configured for communicating with the outside world through reverse proxy server 106. In one embodiment, network 228 is configured as a packet-switched network that can support such protocols as the HyperText Transport Protocol (HTTP). In certain embodiments, a firewall 118 may be configured to provide protection against unauthorized clients from connecting to network 116 and other devices that are logically behind the firewall.

Local Servers 108-114 represent computers, or groups of hardware or software components that execute as one or more computer systems. Local servers 108-114 are configured to manage and store electronic content, some of which may include links to other electronic content within local network 116. For example, local servers 108-114 may be configured as internal Web servers. In certain embodiments, a local DNS server is configured to dynamically assign IP addresses to local servers 108-114. For example, one of the local servers 108-114 may act as local DNS to dynamically assign local IP addresses to the different devices that are connected to local network 116.

Reverse proxy server 106 is a computer, or a group of hardware or software components or processes that cooperate or execute in one or more computer systems. The reverse proxy server 106 is coupled to the local network 116 and is configured as a portal device that controls remote access to the local network 116 and local servers 108-114. Reverse proxy server 106 may be logically located within firewall 118 or may be configured outside firewall 118 and thus potentially require authentication to access the resources of local network 116. In one embodiment, reverse proxy server 106 includes a servlet that is configured to respond to requests from clients that are located outside of local network 116. In certain embodiments, reverse proxy server 106 is configured to authentication and authorization, verifies identities, grants or denies authorizations, and logs accounting records.

As will be described in further detail below, reverse proxy server 106 is configured to retrieve electronic content from local servers 108-114 and to update ("wrap") the links within the content to include the address of reverse proxy server 106.

In certain embodiments, a WAP gateway device 104 is used to perform protocol conversions between protocols used within local network 116 and those used by clients outside local network 116. For example, WAP gateway 104 may be configured to translate messages from WAP to HTTP and from HTTP to WAP.

In one embodiment, client 102 is a cellular phone, Palm Pilot, or other highly constrained device, that is capable of communicating with reverse proxy server 106 via WAP gateway 104. Client 102 is used by or associated with a user 122. Although one client 102 is shown in FIG. 1 by way of example, any number of clients can be included in the system 100, and multiple connects may be simultaneously established between different client devices and reverse proxy server 106. In certain embodiments, client 102 is configured to execute a browser type application, such as Netscape Navigator®, Microsoft Internet Explorer® or other similar type of WAP or HTML browser application that has been developed for use in high constrained devices. User 122 can use the browser application to communicate with reverse proxy server 106, potentially through WAP gateway 104. In certain embodiments, user 122 may be required to enter a login ID and password which is used by reverse proxy 106 to authenticate the user 122 as being authorized to access the content of local network 116.

As depicted, client 102 is connected to a non-local network (i.e., a network other than local network 116) that does not have the ability to resolve address information that is associated with electronic content that is maintained with local network 116. For example, non-local network 120 may represent a private or public network, such as the Internet, which does not have the means for resolving links that are associated with electronic content that is maintained with local network 116. In addition, non-local network 120 may be formed using a variety of different mediums, including but not limited to electrical wire or cable, optical, or wireless connections.

Processing Electronic Content Requests

Figure 2C:
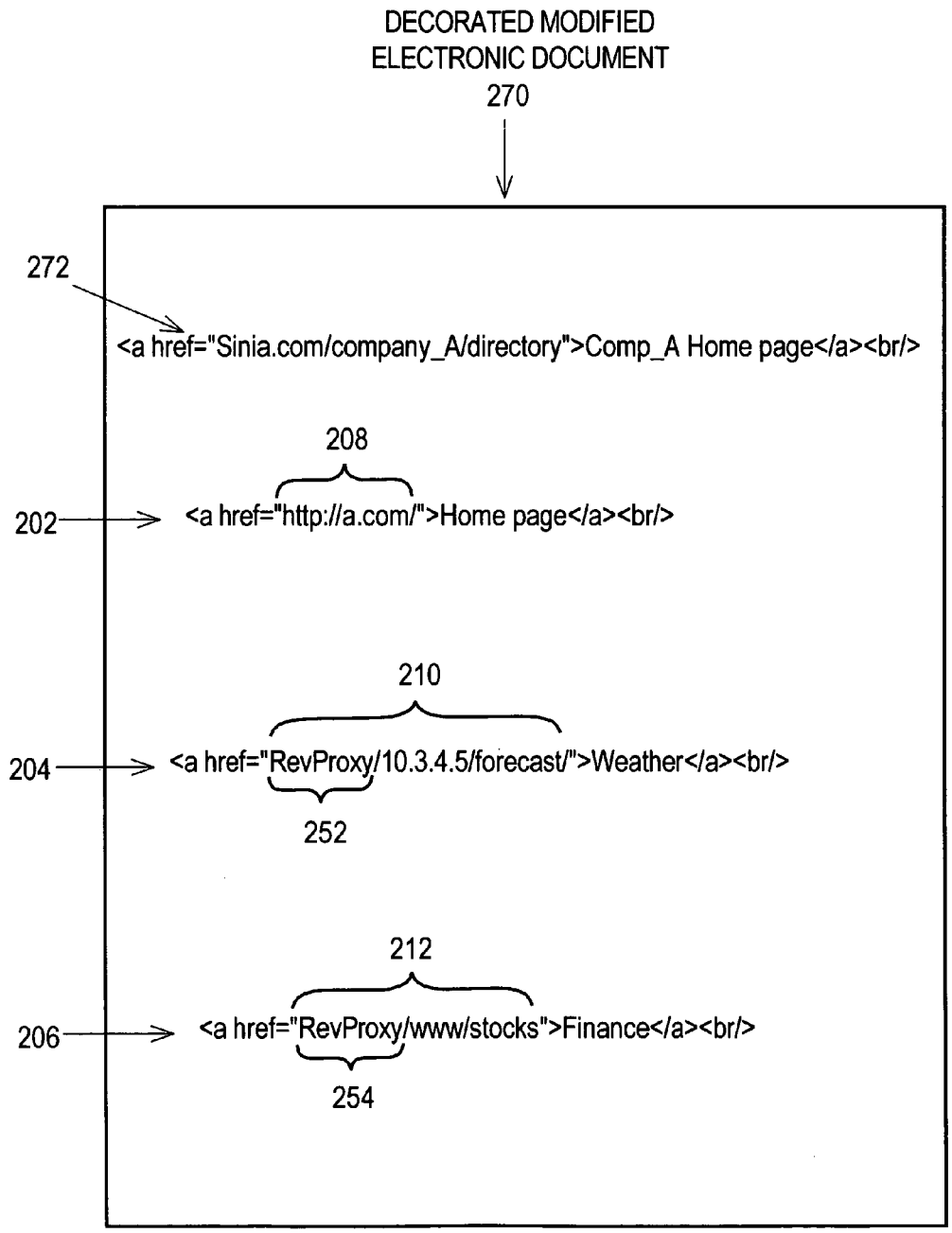
FIG. 2C illustrates a decorated modified electronic document in which an additional link has been inserted into a modified electronic document.
Figure 3:
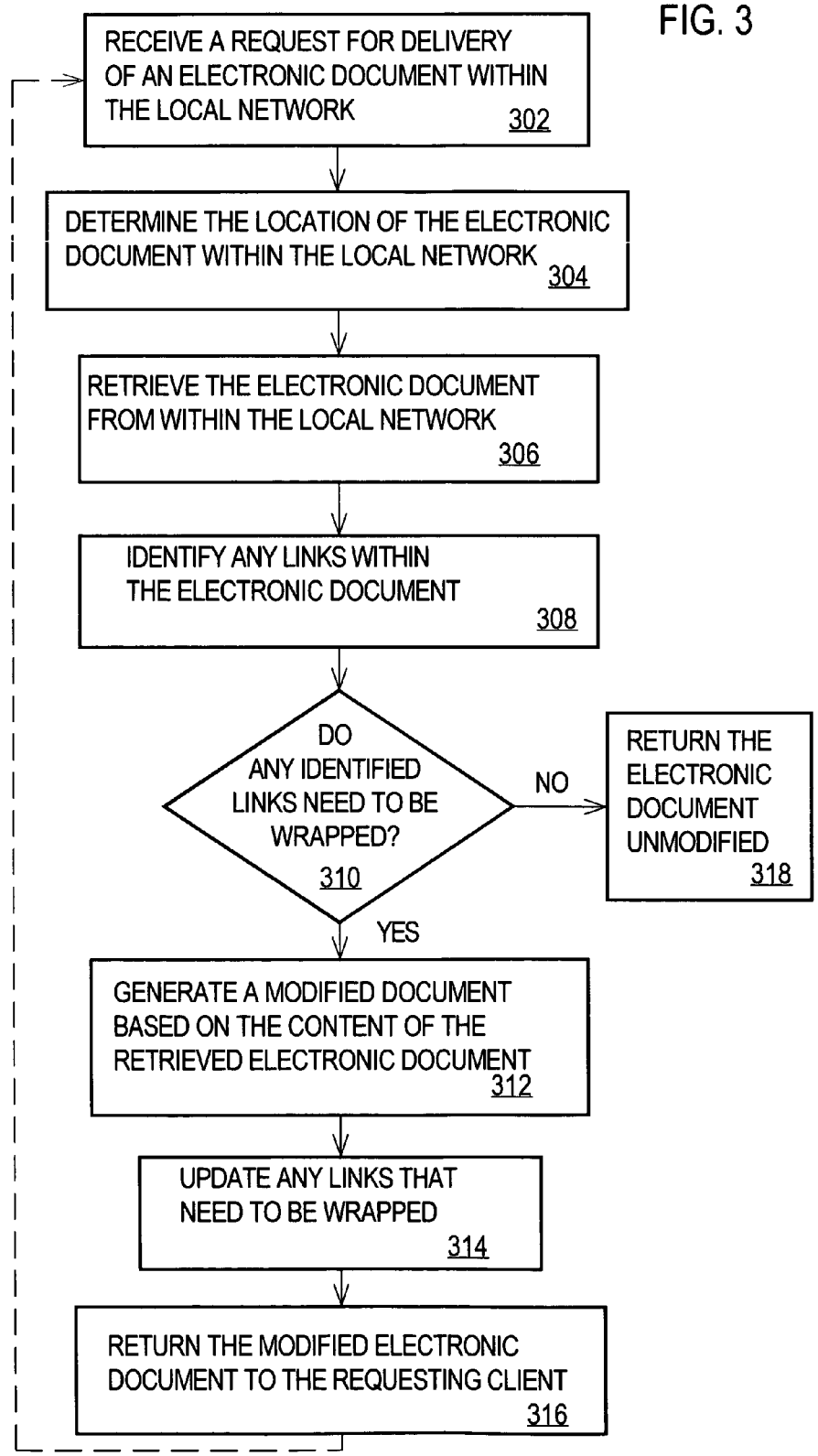
FIG. 3 is a flow diagram that illustrates an example of a method for processing electronic content requests that are received from clients outside the local network.

FIG. 3 is a flow diagram that illustrates an example of a method for processing electronic content requests that are received from clients outside the local network. For explanation purposes, FIG. 3 is described in reference to the components of FIG. 1, FIG. 2A and FIG. 2B.

At block 302, reverse proxy server 106 receives a request from a client 102 for delivery of electronic content. For example, the received request may be for the delivery of electronic document 200 shown in FIG. 2A.

At block 304, reverse proxy 106 determines the location of the electronic content within local network 116. For example, using a local DNS, reverse proxy server 106 may determine that the requested electronic document 200 is located on local server 108.

At block 306, reverse proxy server 106 retrieves the electronic content from within the local network 116.

At block 308, reverse proxy server 106 identifies any links that are contained with the electronic content. For example, in retrieving electronic document 200, reverse proxy server 106 identifies that the electronic document 200 includes links 202, 204 and 206. In this example, link 202 includes an address portion 208 that corresponds to an address that is resolvable outside local network 116 (i.e., resolvable by the Internet DNS). Link 204 contains an address portion 210 that includes a numerical IP address ("10.3.4.5") that was assigned by the local DNS and thus is not resolvable outside local network 116. Link 206 contains an address portion 212 that includes an unqualified symbolic name ("www/stocks") that is an internal name within local network 116 and thus also not resolvable outside local network 116.

At block 310, reverse proxy server 106 determines whether the retrieved electronic content contains any links that need to be wrapped. For example, reverse proxy server 106 determines that links 202 and 204 are not resolvable outside local network 116 and thus addresses 210 and 212 need to be wrapped with information identifying reverse proxy server 106. In certain embodiments, although a link is resolvable outside local network 116, for example link 202, reverse proxy automatically wraps the link's address (i.e., address 208) to require any request based on selection of the link to travel via reverse proxy server 106. If the reverse proxy server 106 determines that no links need to be wrapped, at block 318, the electronic content is delivered back to the requesting client unmodified.

Alternatively, if the reverse proxy server 106 determines that one or more links need to be wrapped, at block 312, reverse proxy server 106 generates a modified electronic content based on the contents of the electronic content that was retrieved.

At block 314, the reverse proxy server 106 updates any links that need to be wrapped and stores them within the modified electronic content. For example, as illustrated in FIG. 2B, reverse proxy server 106 updates address fields 210 and 212 to include a reference to reverse proxy server 106.

At block 316, reverse proxy server 106 delivers the modified electronic content back to the requesting client. Thereafter, when user 122 selects a wrapped link within the modified electronic content, the request for the electronic content is automatically forwarded first to reverse proxy server 106.

As shown by broken return arrow 318, the process of the electronic content requests can be recursively or repeatedly performed.

Initiating Electric Content Requests

According to one embodiment, to access electronic content within the local network, the clients initially connect to the reverse proxy server. In one embodiment, a set of one or more links are stored as "favorites" within the browser application executing on the client. By selecting one of these links, a request is automatically sent to the reverse proxy server to initiate the process of providing access to locally stored electronic content via links that are only resolvable within the local network. For example, a user may store a URL that is linked to a Web page or "Deck" (a set of related pages transmitted as a group in response to a single request) that is contained on reverse proxy server 106 and which provides an index into electronic content (for example, emails, financial reports, corporate directories, etc.) that are located within local network 116. The user may then select one of these links to begin accessing content that is stored within the local network 116. FIG. 2D illustrates an example of a link 290 that may be sent to the reverse proxy server to initiate the process of providing access to locally stored electronic content via links that are only resolvable within the local network. In this example, address portion 292 includes an external address portion 294 that identifies the reverse proxy server and which is resolvable outside the local network. In addition, address portion 292 also includes an internal address portion 296 that is associated with electronic content that resides within local network 116 and which is resolvable by the reverse proxy server but not resolvable outside local network 116.

In one embodiment, when a client initially connects to the reverse proxy server the reverse proxy server verifies that the address (URL) associated with the link is fully qualified. As used herein, the term "fully qualified" means that the URL contains a "scheme," typically "http:" or "https:," a host delimiter ("/"), and a hostname, plus the full path (list of directories) to the named resource. In one embodiment, to verify that the URL of the link is fully qualified the reverse proxy server examines the internal address portion of the URL to verify that it is resolvable by the reverse proxy server. The following presents one example of the steps that a user may be perform to initially connect to the reverse proxy server. First, the user creates a "bookmark" containing the fully qualified URL of a document or service of interest. In this example, the document resides on a server (internal1) that is on their local intranet, and is invisible to external clients and Internet DNS servers outside their local intranet. For explanation purposes, the bookmark URL created by the user is as follows:

http://internal1.company.com/directory.wml.

For further explanation purposes, the bookmark URL http://internal1.company.com/directory.wml. is assumed to be associated with a document on the local intranet that contains relative (non-fully qualified) links to weather.wml, stocks.wml, and time.wml:

```
<wml><card>
  <a href="weather.wml">Weather</a><br/>
  <a href="stocks.wml">Stocks</a><br/>
  <a href="time.wml">Time</a><br/>

</card></wml>
```

It is further assumed that the reverse proxy server is accessible from the Internet, and that it resides at https://www.company.com/RevProxy. ("reverse proxy server URL"). To cause the user's client to initially connect to the reverse proxy server, the bookmark URL must be wrapped with the reverse proxy server URL. A variety of methods may be used to wrap bookmark URLs with the reverse proxy server URL. For example, in one embodiment, software executing on the user's client is configured to automatically wrap the reverse proxy server URL around the bookmark URL in the user's bookmark list. For example, a plug-in or other software module may be configured on the client machine to allow the user to select specific bookmarks that are to be wrapped with information identifying the reverse proxy server. By selecting a desired set of links the user can create a list of "wrapped" links that are automatically sent to the reverse proxy server when selected.

For example, by selecting the bookmark URL above the user may cause the bookmark URL to be wrapped to generate the "wrapped" URL:

https://www.company.com/RevProxy/http://internal1.company.com/directory.wml.

Thereafter, when the user accesses (selects) the wrapped URL, the Reverse Proxy loads the document from the local intranet that is located at the fully qualified URL http://internal1.company.com/directory.wml and rewrites all of the links that are contained within the document. For example, the non-fully qualified link weather.wml is merge with the current fully qualified URL (http://internal1.company.com/directory.wml) to generate fully qualified link http://internal1.company.com/weather.wml.

Next, the fully qualified link is wrapped with the reverse proxy server URL by concatenating the URL of the Reverse Proxy (https://www.company.com/RevProxy), and a forward slash ("/"), to the fully qualified link to create the modified URL: https://www.company.com/RevProxy/http://internal1.company.com/weather.wml This process may then be performed on each of other relative non-fully qualified links (weather.wml, stocks.wml, and time.wml) to generate the following fully resolvable document:

<wml><card>
  <a href="https://www.company.com/RevProxy/http://internal1.company.com/weather.wml">Weather</a><br/>
  <a href="https://www.company.com/RevProxy/http://internal1.company.com/stocks.wml">Stocks</a><br/>
  <a href="https://www.company.com/RevProxy/http://internal1.company.com/time.wml">Time</a><br/>
</card></wml>

Thereafter, when the user clicks on (selects) any of these links, the wrapping process is repeated for the next set of links that are contained within the retrieved document.

As previously indicated, several methods may be used to rewrite the URLs that are associated with a particular link. For example, the following Java code provides one example of how the reverse proxy server can ensure that the reverse proxy server is presented with fully qualified internal URLs in response to a user activating (e.g., selecting) a link in a page that was previously returned by the reverse proxy server. In this example, it is assumed that the variable refURL is an object of class java.net.URL that contains the URL of the document currently being accessed. (http://internal1.company.com/directory.wml). It is also assumed that the String variable path contains the URL currently being examined ("weather.wml") and that the String variable revProxyURL contains the address of the Reverse Proxy itself ("https://www.company.com/RevProxy").

Then, for each URL encountered, the following steps are performed to create and return the fully qualified and rewritten URL:

URL temp=new URL(refURL, path);
StringBuffer sb=new StringBuffer(revProxyURL);
sb.append("/")
sb.append(temp.toString( ); return sb.toString( )

Decorated Modified Electronic Documents

In certain embodiments, in generating the updated content the reverse proxy mechanism further modifies ("Decorates") the updated content by including one or more additional links that did not exist in the content at the time it was retrieved. In one embodiment, the one or more additional links provide a user with the ability to jump to a particular page that was not previously accessible via the originally retrieved content. FIG. 2C illustrates a decorated modified electronic document 270 in which an additional link 272 has been inserted into the modified electronic document 250 that was previously shown in FIG. 2B. By including one or more additional links within the modified content a mechanism is provided whereby a user may jump to a particular page that contains content for which the user desires access. In certain embodiments, the additional links are to content that is maintained by the reverse proxy server and/or the local network. For example, additional link 272 may be a link to the home page of the particular company that owns the local network. This home page may include information and/or links that provide access to the company's resources, such as employee mailboxes, the company's directory, news articles about the company, etc.

In other embodiments, the additional links are to content that is maintained outside the local network. For example, additional link 272 may be a link to content that is located on a server that provides global weather reports and which is outside the local network. In one embodiment, the additional links associated with content that is located outside the local network are wrapped to include information that identifies the reverse proxy server whereby selecting the link guarantees that the reverse proxy server will receive the corresponding request.

Different Clients and Multiple Servers

In the embodiments described above, the client that sends the request for the content is the same client to which the modified content is delivered. However, in alternative embodiments, the client that sends the request for the content may request the content to be sent to a different client. In such an embodiment, the client sending the request may be part of the local network, while the client to which the modified content is delivered is outside the local network.

In addition, the embodiments described above refer to a reverse proxy server that is able to both (1) be addressed from outside the local network, and (2) address content within the local network. However, in alternative embodiments, these functions may be performed by two or more servers. For example, a first server outside the local network may receive a request and forward it to a second server within the local network. The second server may retrieve the content, modify the links to refer to the first server, and deliver the modified content to the client. Selection of the modified links would cause a message to be sent to the first server again, and the process would be repeated.

Alternatively, the second server can send the unmodified content to the first server, and the first server can modify the links with address information from the first server. Selection of the modified links would cause a message to be sent to the first server again, and the process would be repeated.

HARDWARE EXAMPLE

Figure 4:
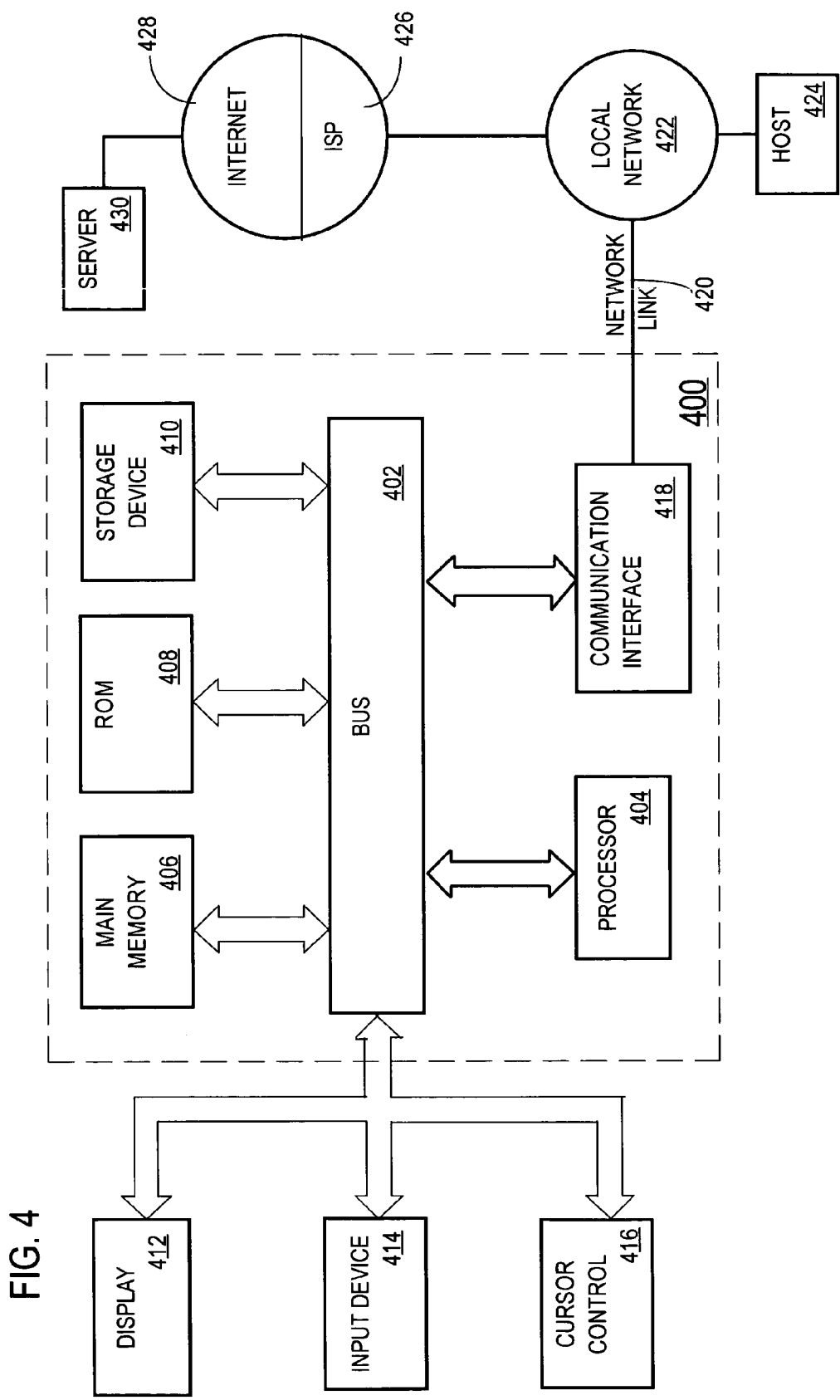
FIG. 4 is a block diagram of a computer system with which an embodiment may be carried out.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Alternatives, Extensions

In describing certain embodiments of the invention, several drawing figures have been used for explanation purposes. However, the invention is not limited to any particular. The invention includes other contexts and applications in which the mechanisms and processes described herein is available to other mechanisms, methods, programs, and processes. Thus, the specification and drawings are, accordingly, to be regarded in an illustrative rather than a restrictive sense.

For example, although client 102 was described as a highly constrained device that connected to reverse proxy server 106 via a wireless connection, in certain embodiments, client may be configured as personal computer, Lap top, workstation or other form of computer system that can connect to reverse proxy server other than through a wireless connection. For example, client 102 may instead be configured as a lap-top computer that is connected directly or indirectly (i.e., through an Internet Service Provider) to the Internet thus providing a communication path between client 102 and reverse proxy server 106 that does not include a gateway mechanism such as WAP gateway 104.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method of providing information from a network including a network device to a client device outside of the network via a server associated with the network, said method comprising the steps of:
   (a) receiving a request from the client device at the server for a first electronic content from said network;
   (b) retrieving, by the server, said first electronic content from said network;
   (c) identifying, by the server, a link within said first electronic content;
   (d) determining, by the server, whether said link identified in said step (c) is resolvable by an external Internet domain name system or alternatively by a domain name system internal to said network;
   (e) wrapping, by the server, said link to obtain a wrapped version of said link that identifies a resolvable address on the network in the event it is determined in said step (d) that said link is resolvable by the domain name system internal to said network, and not wrapping said link in the event it is determined in said step (d) that said link is resolvable by the external Internet domain name system, wherein said wrapped version provides remote access to respective content within the network that is otherwise unattainable by the client device outside the network;
   (f) delivering a modified version of said first electronic content to the client device, wherein said modified version of said first electronic content includes said wrapped version of said link; and
   (g) delivering an original version of said first electronic content to said client device if said link is not wrapped in said step (e), wherein said original version is said first electronic content that is unmodified.

2. The method of claim 1, wherein said first electronic content is an electronic document and said modified version of said first electronic content is a modified version of said electronic document.

3. The method of claim 1, wherein said link is a URL and said modified version of said link is a modified version of said URL.

4. The method of claim 1, wherein said link includes:
   an external address portion identifying said network device; and
   an internal address portion identifying a second electronic content within said network.

5. The method of claim 4, wherein said external address portion can be resolved outside said network, and wherein said internal address portion cannot be resolved outside said network and can be resolved in said network.

6. The method of claim 1, wherein said step (e) includes the step of:
   (1) inserting a reference to said network device in said modified link.

7. The method of claim 6, wherein said link does not include a reference to said network device.

8. The method of claim 1, wherein said modified link includes a reference to said network device.

9. The method of claim 8, wherein said link does not include a reference to said network device.

10. The method of claim 1, wherein said link includes an address for a second electronic content in said network and said modified version of said link includes an address for said second electronic content in said network.

11. The method of claim 1, further including the steps of:
    (h) identifying additional links within said first electronic content; and
    (i) wrapping said additional links to obtain wrapped versions of said additional links.

12. The method of claim 11, further including the step of:
    (j) determining said additional links cannot be resolved outside of said network.

13. The method of claim 11, wherein said modified version of said first electronic content contains said wrapped versions of said additional links.

14. The method of claim 1, wherein said request includes an address for said first electronic content, wherein said method further includes the steps of:
    (h) verifying said address is fully qualified.

15. The method of claim 1, further including the step of:
    (h) inserting a second link into said modified version of said first electronic content, wherein said second link addresses a fourth electronic content not addressed by any link in said first electronic content.

16. One or more processor readable storage devices having processor readable code embodied on said processor readable storage devices, said processor readable code for programming one or more processors to perform a method of providing information from a network including a network device to a client device outside of the network via a reverse proxy server associated with the network, said method comprising the steps of:
   (a) receiving a request from the client device at the reverse proxy server for a first electronic content from said network;
   (b) retrieving, by the reverse proxy server, said first electronic content from said network;
   (c) identifying, by the reverse proxy server, a link within said first electronic content;
   (d) determining, by the reverse proxy server, whether said link identified in said step
   (c) is resolvable by an external Internet domain name system or alternatively by a domain name system internal to said network;
   (e) wrapping, by the reverse proxy server, said link to obtain a wrapped version of said link that identifies a resolvable address on the network in the event it is determined in said step (d) that said link is resolvable by the domain name system internal to said network, and not wrapping said link in the event it is determined in said step (d) that said link is resolvable by the external Internet domain name system, wherein said wrapped version provides remote access to respective content within the network that is otherwise unattainable by the client device outside the network;

(f) delivering a modified version of said first electronic content to the client device wherein said modified version of said first electronic content includes said wrapped version of said link; and (g) delivering an original version of said first electronic content to said client device if said link is not wrapped in said step (e), wherein said original version is said first electronic content that is unmodified.

17. One or more processor readable storage devices according to claim 16, wherein said first electronic content is an electronic document and said modified version of said first electronic content is a modified version of said electronic document.

18. One or more processor readable storage devices according to claim 16, wherein said link includes:
   an external address portion identifying said network device; and
   an internal address portion identifying a second electronic content within said network.

19. One or more processor readable storage devices according to claim 18, wherein said external address portion can be resolved outside said network, and wherein said internal address portion cannot be resolved outside said network and can be resolved in said network.

20. One or more processor readable storage devices according to claim 16, wherein said step (d) includes the step of:
   (1) determining said link cannot be resolved outside of said network, wherein said step (e) is only performed if said step (d) determines to wrap said link.

21. One or more processor readable storage devices according to claim 16, wherein said step (e) includes the step of:
   (1) inserting a reference to said network device in said modified link.

22. One or more processor readable storage devices according to claim 21, wherein said link does not include a reference to said network device.

23. One or more processor readable storage devices according to claim 22, wherein said link includes an address for a third electronic content in said network and said modified version of said link includes an address for said third electronic content in said network.

24. One or more processor readable storage devices according to claim 16, further including the steps of:
   (h) identifying additional links within said first electronic content; and
   (i) wrapping said additional links to obtain wrapped versions of said additional links.

25. One or more processor readable storage devices according to claim 24, wherein said modified version of said first electronic content contains said wrapped versions of said additional links.

26. One or more processor readable storage devices according to claim 16, wherein said request includes an address for said first electronic content, wherein said method further includes the steps of:
   (h) verifying said address is fully qualified.

27. One or more processor readable storage devices according to claim 16, further including the step of:
   (h) inserting a second link into said modified version of said first electronic content, wherein said second link addresses a fourth electronic content not addressed by any link in said first electronic content.

28. A system, comprising:
   one or more communication interfaces;
   one or more storage devices; and
   one or more processors in communication with said one or more storage devices and said one or more communication interfaces, said one or more processors performs a method of providing information from a network including a network device to a client device outside of the network via a reverse proxy server associated with the network, said method comprising the steps of:
   (a) receiving a request from the client device at the reverse proxy server for a first electronic content from said network;
   (b) retrieving, by the reverse proxy server, said first electronic content from said network;
   (c) identifying, by the reverse proxy server, a link within said first electronic content;
   (d) determining, by the reverse proxy server, whether said link identified in said step
   (c) is resolvable by an external Internet domain name system or alternatively by a domain name system internal to said network;
   (e) wrapping, by the reverse proxy server, said link to obtain a wrapped version of said link that identifies a resolvable address on the network in the event it is determined in said step (d) that said link is resolvable by the domain name system internal to said network, and not wrapping said link in the event it is determined in said step (d) that said link is resolvable by the external Internet domain name system, wherein said wrapped version provides remote access to respective content within the network that is otherwise unattainable by the client device outside the network;
   (f) delivering a modified version of said first electronic content to the client device wherein said modified version of said first electronic content includes said wrapped version of said link; and
   (g) delivering an original version of said first electronic content to said client device if said link is not wrapped in said step (e), wherein said original version is said first electronic content that is unmodified.

29. The system of claim 28, wherein said link includes:
   an external address portion identifying said network device, wherein said external address portion can be resolved outside said network; and
   an internal address portion identifying a second electronic content within said network wherein said internal address portion cannot be resolved outside said network and can be resolved in said network.

30. The system of claim 28, wherein said link does not include a reference to said network device and said step (e) includes the step of:
   (1) inserting a reference to said network device in said modified link.

31. The system of claim 28, wherein said link includes an address for a third electronic content in said network and said modified version of said link includes an address for said third electronic content in said network.

32. The system of claim 28, further including the steps of:
   (h) identifying additional links within said first electronic content; and
   (i) wrapping said additional links to obtain wrapped versions of said additional links.

33. The system of claim 32, wherein said modified version of said first electronic content contains said wrapped versions of said additional links.

34. The system of claim 28, wherein said request includes an address for said first electronic content, wherein said method further includes the steps of:

(h) verifying said address is fully qualified.

35. The system of claim 28, further including the step of:

(h) inserting a second link into said modified version of said first electronic content, wherein said second link addresses a fourth electronic content not addressed by any link in said first electronic content.

36. A method of providing information from a network including a network device to a first client outside of the network via a reverse proxy server, said method comprising the steps of:

(a) receiving a request from a second client device for a first electronic content to be sent from said network to the first client device;

(b) retrieving, by the reverse proxy server, said first electronic content from said network;

(c) identifying, by the reverse proxy server, a link within said first electronic content;

(d) determining, by the reverse proxy server, whether said link identified in said step (c) is resolvable by an external Internet domain name system or alternatively by a domain name system internal to said network;

(e) wrapping, by the reverse proxy server, said link to obtain a wrapped version of said link that identifies a resolvable address on the network in the event it is determined in said step (d) that said link is resolvable by the domain name system internal to said network, and not wrapping said link in the event it is determined in said step (d) that said link is resolvable by the external Internet domain name system, wherein said wrapped version provides remote access to respective content within the network that is otherwise unattainable by the client device outside the network; and (f) delivering a modified version of said first electronic content to the client device if said link is wrapped in said step (e), wherein said modified version of said first electronic content includes said wrapped version of said link; and (g) delivering an original version of said first electronic content to said client device if said link is not wrapped in said step (e), wherein said original version is said first electronic content that is unmodified.

37. The method of claim 36, wherein said second client device is outside of the network.

38. The method of claim 36, wherein said second client device is inside of the network.

39. A method of providing information from a network including a network device to a client device outside of the network via a server associated with the network, said method comprising the steps of:

(a) receiving a request from the client device at the server for a first electronic content from said network;

(b) retrieving, by the server, said first electronic content from said network;

(c) identifying, by the server, a link within said first electronic content, wherein said link includes an external address portion identifying said server which is resolvable outside the network and an internal address portion identifying a second electronic content within said network which is resolvable by the server but not resolvable outside the network;

(d) determining, by the server, whether said link identified in said step (c) is resolvable by an external Internet domain name system or alternatively by a domain name system internal to said network;

(e) wrapping, by the server, said link to obtain a wrapped version of said link that identifies a resolvable address on the network in the event it is determined in said step (d) that said link is resolvable by the domain name system internal to said network, and not wrapping said link in the event it is determined in said step (d) that said link is resolvable by the external Internet domain name system, wherein said wrapped version provides remote access to respective content within the network that is otherwise unattainable by the client device outside the network;

(f) delivering a modified version of said first electronic content to the client device, wherein said modified version of said first electronic content includes said wrapped version of said link; and (g) delivering an original version of said first electronic content to said client device if said link is not wrapped in said step (e), wherein said original version is said first electronic content that is unmodified.

\* \* \* \* \*

UNITED STATES PATENT AND TRADEMARK OFFICE
CERTIFICATE OF CORRECTION

PATENT NO. : 7,818,435 B1  Page 1 of 1
APPLICATION NO. : 09/738013
DATED : October 19, 2010
INVENTOR(S) : Herbert D. Jellinek It is certified that error appears in the above-identified patent and that said Letters Patent is hereby corrected as shown below:

IN THE CLAIM COL. 15, CLAIM 36, LINE 37:

Remove -- and --, so the sentence is read "…, wherein said wrapped version provides remote access to respective content within the network that is otherwise unattainable by the client device outside the network; and"

Signed and Sealed this

Thirtieth Day of November, 2010

David J. Kappos
*Director of the United States Patent and Trademark Office*